No. 696,860. Patented Apr. 1, 1902.
J. W. DAWSON.
APPARATUS FOR JUDGING THE COLOR AND DENSITY OF PHOTOGRAPHIC NEGATIVES OR LIKE BODIES.
(Application filed Dec. 10, 1900.)
(No Model.)
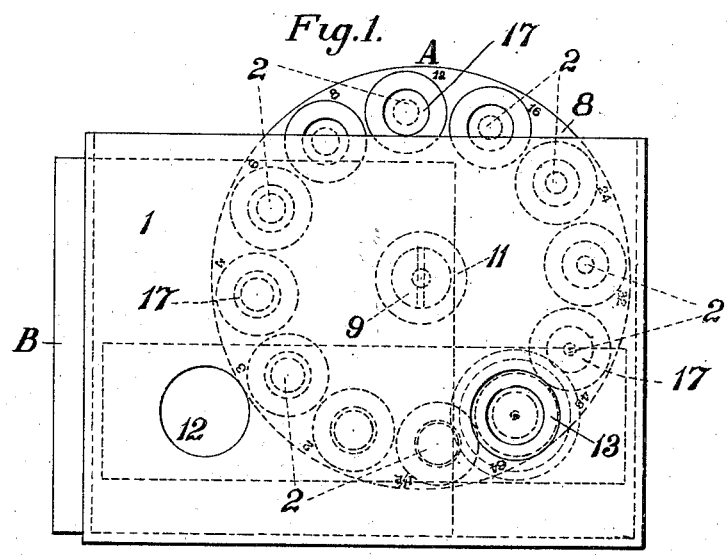
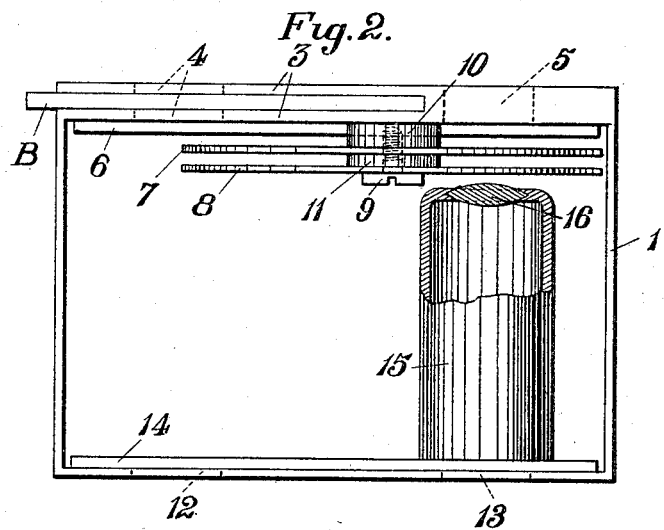
WITNESSES. INVENTOR.

UNITED STATES PATENT OFFICE.

JOHN WILLIAM DAWSON, OF BRADFORD, ENGLAND.

APPARATUS FOR JUDGING THE COLOR AND DENSITY OF PHOTOGRAPHIC NEGATIVES OR LIKE BODIES.

SPECIFICATION forming part of Letters Patent No. 696,860, dated April 1, 1902.

Application filed December 10, 1900. Serial No. 39,367. (No model.)

*To all whom it may concern:*

Be it known that I, JOHN WILLIAM DAWSON, a subject of the Queen of Great Britain, residing at Bradford, in the county of York, England, have invented a certain new and useful Apparatus for Judging the Color and Density of Photographic Negatives or Like Bodies, of which the following is a specification.

My invention relates to an improvement in apparatus for judging the color and density of photographic negatives and other bodies with the object of classifying them by a photometric method, the instrument being capable of use as a photometer if used with a standard source of illumination.

By the aid of this instrument negatives of a varying color and density can be classified with reference to the amount of exposure to light necessary to produce an effective print from them. This is particularly of advantage when exposing or printing on bromid-paper or on glass or rigid plates with sensitive surfaces, as the operator is able to tell beforehand the length of the exposure necessary to print from any negative according to its classification.

The invention consists of an apparatus employing varying or adjustable apertures or graduations of density and a screen or screens so arranged that light passing through a negative or light-pervious object illuminates the screen or screens and can be measured or classified with a corresponding illumination obtained through one or other of the varying or adjustable apertures or the like.

The accompanying drawings illustrate one form my invention may assume, and in same—

Figure 1 is an elevation of the apparatus viewed from the side through which the operator looks. Fig. 2 is a plan, partly in section.

The apparatus is by preference constructed in the form of a box 1, the back of which, as seen in Fig. 2, consists partly of a double wall 3, which, if the box is made of thin wood or millboard or similar material, may be lined on the interior faces with velvet cloth or the like and by reason of its construction will have a slight spring, so as to form a species of clip, into which the negative or the like B can be inserted. This double-wall portion has apertures 4 4 through same; but the remainder of the back is solid and has a single aperture 5. On the inside of the box and secured to the back is a strip of semitransparent material 6, such as frosted glass, forming a screen, extending across the apertures 4 5. Carried by the back and also inside the box is a disk 7, having a number of apertures 2 therein, graduated in size, as seen in Fig. 1, and in front of same and also carried by the back may be a further disk 8, having apertures 17, which are all of the same size, filled or covered with tinted materials (which may be glass) of known actinic values. Both these disks bear suitable numbers, which when exhibited at the point A outside the box indicate which aperture or tint is opposite the aperture 5. This numbering is visible on the disk 8 in Fig. 1, as on the front of same; but on the disk 7 it is placed on the back, so as to be visible from that direction. Both disks may be attached by a screw 9 to a boss 10, secured to the back, a washer 11 separating the two, the arrangement enabling both to be turned independently when the finger is applied to the edge.

The front of the box contains two apertures 12 13, inside of the front wall being secured a screen consisting of a strip 14 of semitransparent material, such as frosted glass, so as to partly obscure the apertures, though other means may be employed for this purpose. Inside the box and in line with the apertures 13 and 5 is secured a tube 15, carrying a lens 16, though it may have simply an aperture, if desired.

It will be seen that the light from a given source illuminating the back of the box may be transmitted through the obscured apertures 4 4 and a negative or the like placed between same onto the semitransparent screen 14 covering the aperture 12 in front of the box, and thus be compared with the light transmitted through aperture 5, one or other of the apertures of disks 7 or 8, (or both, if employed,) through the lens 16 (or aperture) onto the screen 14 covering the aperture 13, the disks being adjusted until the amount of light upon the two screens corresponds, whereupon the negative or the like will be classed according to the number or numbers exhibited at the point A. It will be understood that the apertures in the disk 7 represent the relative densities of the negatives or the like to be classed and that the disk 8 corrects for color, such disk being adjusted until the aperture obscured with the shade or color corresponding with that of the negative or the like is brought in line with the lens and sight aperture, so that the actinic power of the two illuminations on the screened apertures 12 and 13 is equal.

What I claim is—

1. In an apparatus of the character described, and in combination, a movable disk having a series of graduated apertures therein, a casing having an aperture in the back corresponding to one of the apertures in the disk, and a further aperture in front, a semitransparent screen behind the latter aperture, a tube having an aperture carrying a lens in line with the said two apertures, and independent apertures in said casing through which light may be transmitted through the light-pervious object and whereby it can be compared with the light transmitted through the other apertures and disk.

2. In apparatus of the character described and in combination, a disk having apertures graduated in size, a disk carrying tinted material of several shades, a casing having an aperture in the back in line with the apertures of said disks, means for carrying said disks so that they may be adjusted, and a further aperture in the casing through which the light may pass through the pervious object, and semitransparent material covering said apertures in the casing.

In testimony whereof I have hereunto set my hand in the presence of two subscribing witnesses.

JOHN WILLIAM DAWSON.

Witnesses:
 J. B. HOWARD,
 LOUIS WARDLE.